Feb. 16, 1965 C. R. WELTY 3,169,415
SEWER TAPPING
Filed Dec. 26, 1962
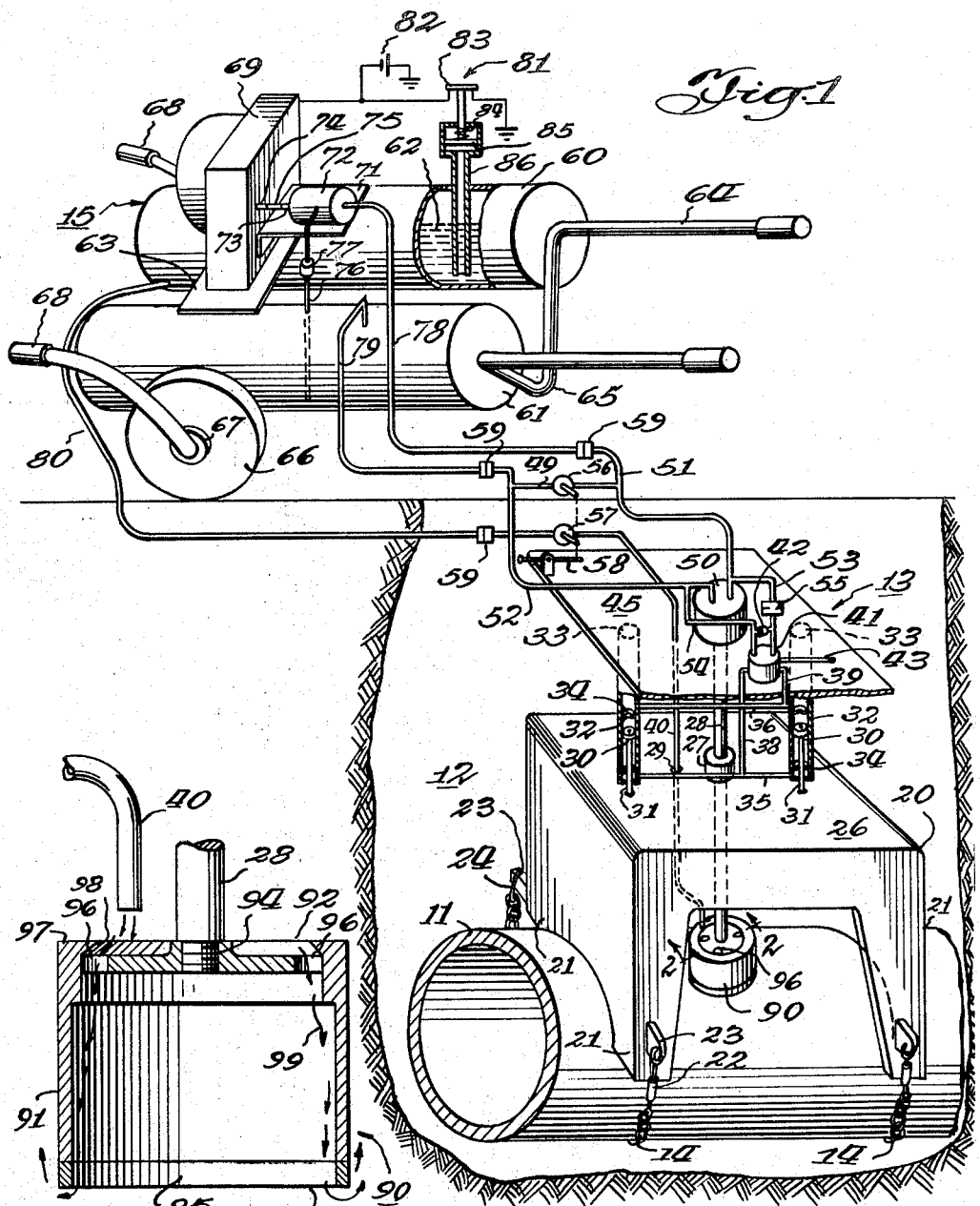
Inventor
Charles R. Welty
By Charles M. Kaplan
Attorney United States Patent Office 3,169,415
Patented Feb. 16, 1965

3,169,415
SEWER TAPPING
Charles R. Welty, Mission, Kans., assignor to Union Tank Car Company, a corporation of New Jersey
Filed Dec. 26, 1962, Ser. No. 247,085
19 Claims. (Cl. 77—14)

This invention relates to cutting circular holes in pipes, and more in particular to improved means for tapping earth-buried sewer mains.

When a dwelling or other structure is to be connected to a buried sewer main, soil must be removed to expose the main, and a hole is provided for connection of a lateral waste pipe. The usual procedure for tapping ceramic earth-buried sewer mains has been to mark a circle on an exposed portion of the sewer main, and then for a workman to use a hammer and chisel to chip away the sewer main until a hole of roughly the desired size is obtained. An obvious disadvantage of this technique is that the size and shape of the hole cannot be precisely controlled. Furthermore, impact of the chisel often cracks the sewer main, thus necessitating costly repairs to prevent leakage.

Attempts have been made to employ rotatable circular cutters to tap holes in earth-buried sewer mains. However, this technique has not gained acceptance for the following reasons. Sewer mains are tapped out of doors, often at relatively inaccessible locations, and no satisfactory power source has been available for rotating the cutters. Consequently, muscle-powered rotation of the cutters was essentially the only technique employed.

Most sewer pipes are made from ceramic materials, such as vitreous clay, and the hard surface of such pipes offers tremendous resistance to cutting. Muscle-powered cutters with tungsten-carbide cutting edges have been used to tap ceramic sewer pipes; however, the slow speed of rotation required and the short life of such cutters make their use so costly and time consuming that the previously described hand chipping is preferred, notwithstanding its disadvantages. Use of diamond edged cutters has not been successful even though they can be rotated at much higher speeds than tungsten-carbide cutters, and have longer life when properly used. The reason is that muscle-powered cutting appliances do not permit control of rotation speeds or smooth application of power; the intermittent power surges and widely varying speeds attained by such appliances destroy diamond cutting edges and increase the time required to cut holes in sewer pipes so as to make their use impractical when compared with hand chipping.

Accordingly, it is an object of the invention to provide mechanisms for cutting holes in sewer pipes that eliminate deficiencies of the prior art.

Another object is to provide a portable, self-subsisting prime mover for powering cutting mechanisms.

Another object is to provide sewer tapping mechanisms usable in inaccessible locations without requiring muscle-powered operation.

Another object is to provide a cutter mechanism for tapping sewer pipes that is driven at controlled speeds by hydraulic fluids.

A further object is to provide a portable, power-driven cutter mechanism for tapping sewer pipes in which the cutter is advanced into the sewer pipe by application of uniform hydraulic pressure.

Another object is to provide a portable prime mover assembly for supplying high pressure hydraulic fluid to a working device in which a container for the hydraulic fluid is employed as a part of a carrier structure for the prime mover.

Another object is to provide improved cutter structure in which non-pressurized liquid for cooling and lubricating the cutter is entrapped by the cutter body and caused to flow across its cutting surface.

A further object is to provide an improved method of cooling and lubricating a cutting surface without employing fluids pumped under pressure.

A further object is to provide an improved system for controlling the flow of fluid in a cutting assembly employing a cooling and lubricating liquid for cutter surfaces and a hydraulic fluid for powering a motor that rotates the cutters.

Another object is to provide a fluid powered cutter subassembly attachable to an earth-buried sewer pipe in which flexible fluid couplings are not required, notwithstanding relative movement of components of the subassembly.

A further object is to provide a control circuit for a prime mover that prevents energization of the prime mover unless a predetermined amount of liquid is present in a container associated with the system powered by the prime mover.

Other objects and advantages of the invention will be apparent from the drawing, specification, and claims, and the scope of the invention will be pointed out in the claims.

Briefly stated, according to one aspect of the invention, a complete apparatus combination for cutting a circular hole in an exposed portion of an earth-buried sewer pipe may include the following subcombinations: a cutter requiring a supply of cooling liquid; detachable means for supporting the cutter on the sewer pipe; hydraulic means for rotating the cutter; pressure-actuated means for advancing the cutter; conduit means movable with the cutter for supplying cooling liquid; a portable, self-subsisting prime mover for supplying fluid under pressure to the hydraulic means; valve means simultaneously controlling flow of cutter cooling liquid and hydraulic fluid; and means for deenergizing the prime mover unless a predetermined amount of cutter cooling liquid is available. Other aspects of the invention include specific features of the above subcombinations considered individually, as for example, the specific structure of the cutter including an inwardly slanting rim at one end for trapping cooling liquid, and methods of cooling the cutter without requiring liquid pumped under artificial pressure.

In the drawing:

FIG. 1 is a schematic, perspective, partially cross-sectional view of a portable sewer tapping mechanism in accord with the invention.

FIG. 2 is an enlarged cross-sectional view of a cutter taken generally along the line 2—2 in FIG. 1.

In FIG 1, an embodiment of the portable sewer tapping mechanism is shown attached to a sewer main 11 lying in a trench 12 in the earth. A cutter actuating assembly 13 is secured to an exposed portion of the main; the assembly 13 is hydraulically coupled to a portable, self-subsisting prime mover assembly 15.

The cutter actuating assembly 13 includes rigid support frame means 20 having legs 21 which rest on the sewer main. The legs 21 are immovably attached to the main 11 by chains 14 encircling the main. The chains 14 are attached at one end to screw-actuated turn buckles 22, which, in turn, are secured to ears 23 on the legs 21; the other end of each chain has releasable attaching means, such as a hook 24 insertable in holes in the ears 23 on the opposed legs. Rotation of the turn buckles 22 draws chains 14 snugly against the main and thereby prevents relative movement of the main and frame 20.

A flat plate portion 26 of the frame 20 has a surface supporting bearing means 27 which receives a shaft 28 connected to a cutter 90. The bearing 27 allows both rotational and axial movement of the shaft 28. An oversized opening 29 in the plate 26 slidingly receives a liquid supplying pipe 40. A pair of pistons 30 have their shafts 31 permanently secured to the plate 26.

Cylinders 32 receive the pistons 30 and are permanently secured at ends 33 to rigid plate means 45. The cylinders 32 have stops 34 adjacent their ends for limiting movement thereof with respect to pistons 30. Hydraulic fluid supplying pipe 35 is connected between the lower stops 34 and their associated ends of the cylinders 32, and a similar pipe 36 is connected between the upper stops 34 and their associated cylinder ends. Pipes 35 and 36 respectively, are connected by pipes 38 and 39 to a flow directing valve 41. Valve 41 has a handle 43 for changing the position thereof so as to cause high pressure hydraulic fluid to flow into either pipe 38 or pipe 39, and hence into either the upper or lower ends of the cylinders 32. Valve 41 is secured to the plate 45 so as to be movable therewith, and the pipes 35 through 39 are rigid, non-flexible tubes which also move with plate 45. Pipe 40 is attached to plate 45 so as to be movable therewith.

Hydraulic motor means 50, such as a Gerotor type motor, is mounted on plate 45. Motor 50 drives shaft 28 to provide power for rotation of cutter 90. Motor 50 is powered by high pressure hydraulic fluid from a high pressure pipe 51. Low pressure hydraulic fluid leaving the motor 50 exits through a low pressure pipe 52. Valve 41 receives high pressure fluid from pipe 51 through pipe 53 upstream from the inlet to the motor 50. Low pressure fluid leaving valve 41 enters pipe 52 through pipe 54 downstream from motor 50. Plate 55 with an aperture of predetermined size smaller than pipe 53 is placed in pipe 53 between pipe 51 and valve 41 to control the rate of flow of fluid to valve 41 to a predetermined valve, and to maintain pressure at motor 50 at a predetermined level. Pressure relief means 42, such as a spring-biased needle valve, interconnects pipes 53 and 54 between valve 41 and plate 55. Pressure relief means 42 cooperates with apertured plate 55 to maintain valve 41 and the pipes connected thereto at a predetermined pressure lower than that in pipe 51.

High pressure pipe 51 and low pressure pipe 52 are short circuited by conduit means 49 having valve means 56 therein. Valve means 57 controls flow in liquid pipe 40. Valves 56 and 57 are interconnected by actuating lever means 58 so that when lever means 58 opens valve means 56 to allow high pressure fluid in line 51 to pass directly into line 52 without reaching motor 50, valve means 57 is closed to stop flow of liquid through pipe 40; this prevents waste of cutter cooling liquid when motor 50 is not running. Correspondingly, when valve means 57 is open, permitting flow of liquid through pipe 40, valve means 56 is closed permitting operation of motor 50. In the preferred embodiment, valve means 56 and 57 are ball valves.

Pipes 40, 51 and 52 are each provided with separable coupling means 59 of any conventional type for attaching same to incoming fluid conduits for delivering or receiving fluids therefrom. Pipe 51 is coupled to a high pressure source of hydraulic fluid, and pipe 52 is coupled to a low pressure return conduit for hydraulic fluid. Pipe 40 is coupled to a source of liquid (such as water) for cooling and lubricating cutter 90, as explained in detail in paragraphs that follow.

The cutter actuating assembly 13 operates as follows:

Lever means 58 is moved to the position closing valve 56 and opening valve 57. High pressure fluid flowing into pipe 51 powers hydraulic motor 50 and then returns through pipe 52 to its source. Motor 50 turns shaft 28 which rotates cutter 90 at a predetermined speed governed by the pressure and volume of fluid flowing through motor 50. This insures relatively constant torque and rotational speed for cutter 90, enabling same to have a diamond-edged cutting surface 95.

To provide uniform application of power forcing the cutter 90 into main 11, mating pistons 30 and cylinders 32 receive fluid from pipe 51. Hydraulic fluid in pipe 51 flows into pipe 53 and through the aperture in plate 55, and then to valve 41. By moving lever 43 to one of two positions, high pressure fluid is caused to flow either through pipe 38 or pipe 39. High pressure flow through pipe 38 and pipe 35 to the lower end of the cylinders 32 forces the cylinders toward the main 11. High pressure flow through pipe 39 and pipe 36 to the upper end of cylinders 32 forces the cylinders away from the main 11. Pressure relief means 42 between lines 53 and 54 allows high pressure fluid to bypass the cylinders 32 when the resistance of main 11 to movement of the cutter 90 prevents relative movement of the pistons and cylinders. This prevents backing up of high pressure fluid in pipes 53 and 51, and controls the pressure of fluid in the cylinders. Since cylinders 42 are secured to plate 45, relative movement thereof with respect to pistons 30, causes plate 45 to advance towards or away from main 11. Plate 45 carries shaft 28 with it, and hence advances cutter 90 either into or away from main 11.

The thusfar described pipes connected to motor 50, valve 41, and cylinders 32 need not be flexible. The reason for this is that by making cylinders 32 movable members in the piston-cylinder combinations, flexible conduits with their disadvantages of easy breakage and leakage are not required. Similarly, liquid pipe 40 should be a rigid tube that passes through hole 29 so as to be movable with plate 45 and cutter 90 to insure a supply of cooling liquid on the cutter, regardless of the position of the cutter. This is particularly significant because the assembly 13 is illustrated in a vertical position on top of main 11 merely to simplify the drawing. The most usual position of the assembly 13 during actual use is roughly 45° to the horizontal so that the hole for the lateral will pass through the side, rather than the top, of main 11; when the assembly 13 is in such postion, the end of pipe 40 must be close to the top of cutter 90 to insure that non-pressurized liquid will actually contact the cutter.

Although high pressure hydraulic fluid may be obtained from any source, a portable, self-subsisting prime mover assembly as described below is preferred. The expression "self-subsisting" is intended to define a power source capable of sustained operation without requiring simultaneous connection to any other power source; for example, an A.C. motor requiring leads connecting it to an A.C. power line would not be "self-subsisting." This ensures that holes can be tapped at remote locations inaccessible to electric power outlets or motor vehicles.

The assembly 15 includes a pair of rigid cylindrical metal containers 60 and 61 of approximately the same size. Container 60 may hold a supply of cutter cooling and lubricating liquid 62. Container 61 may hold a supply of hydraulic fluid for operation of motor 50 and the piston and cylinder combinations. Rigid metallic plate means 63 is secured to the upper surface of containers 60 and 61 adjacent one end to immovably interconnect same. Handle means 64 secured to the other end of containers 60 and 61 immovably interconnects their opposite ends; handle means 64 also provides means for lifting assembly 15, and provides a rest at the bend 65 for supporting the assembly above the ground with the container axes in a generally horizontal position. Wheels 66 on axles 67 attached to the under side of the containers provide means for transporting assembly 15. Handles 68 may be secured to the axles to provide convenient means for lifting the assembly.

A self-subsisting prime mover 69, such as a gasoline powered internal combustion engine, is attached to the plate means 63. The prime mover 69 includes its supply of energy (e.g., the fuel tank of a gasoline engine), so that the prime mover need not be connected to any external source of energy and is thus self-subsisting. Support means 71 is provided for holding a hydraulic fluid pump 72. The pump 72 is driven by connecting its shaft 73 to the output shaft 74 of prime mover 69 by means of a flexible coupling 75. Equivalent power coupling means, such as pulleys driven by a belt, may be employed without departing from the invention.

The inlet of pump 72 is connected through a conduit 76 and filter 77 to the interior of container 61. The outlet of pump 72 is connected to a fluid conduit 78 that is coupled to high pressure pipe 51. A similar fluid conduit 79 is connected to the interior of container 61 for return of hydraulic fluid from the assembly 13. Container 60 has a fluid conduit 80 connected adjacent its bottom for allowing the fluid 62 to flow to line 40. The conduits 78–80 are preferably flexible hoses so that they can assume any number of positions.

Pump means need not be provided for forcing liquid 62 through conduit 80 under artificial pressure, since the assembly 15 will be on the ground above the trench 12, and thus provides a gravitational pressure head to cause flow of liquid 62 to the cutter 90.

Experiments have shown that the life of a cutter 90 with diamond cutting edges can be at least doubled by ensuring that water flows across its cutting surface at all times during operation. Consequently, a control circuit 81 may be provided for preventing actuation of prime mover 69 unless a predetermined level of liquid 62 is present in tank 60. 82 represents a self-contained source of electrical energy for the prime mover 69, which in the case of a conventional portable gasoline engine would be a magneto associated with its fly wheel. A normally closed switch 83 is employed to short circuit source 82 unless the switch 83 is open. Switch 83 may be connected between the source 82 and any important electrical component in the prime mover 69, such as the distributor of a gasoline engine. Switch 83 is normally closed by the action of spring means 84 against a pressure diaphragm 85. The housing for diaphragm 85 includes tube 86 communicating at one end with the diaphragm; the other end of tube 86 is open and extends into container 60 adjacent the bottom thereof so as to be immersed in the liquid 62. The parameters of the spring 84, diaphragm 85, and tube 86 are selected such that when a predetermined level of liquid 62 is in the container 60, air entrapped in tube 86 will be compressed and move diaphragm 85 against the force of spring 84, thus opening switch 83 and allowing prime mover 69 to be energized. When liquid 62 falls below the predetermined level, spring 84 will overcome the pressure of the entrapped air in tube 86, and will close switch 83; this will short circuit source 82, thereby turning off prime mover 69 and preventing continued operation of hydraulic motor 50. This ensures that cutter 90 will not be operated unless sufficient liquid 62 is present to cool its cutting surface.

FIG. 2 shows preferred structure for cutter 90, which has a hollow cylindrical metal body 91 with a partially closed end 92 and an open end 93. End 92 may have a threaded opening 94 for attachment to drive shaft 28. End 93 has a cutting edge 95, which is preferably formed from diamonds attached to body 91 in a conventional bonding matrix. End 92 has one or more openings 96, which are spaced below the upper terminal edge of the body 91 so that an upstanding peripheral rim 97 surrounds the openings. The rim 97 has an inwardly beveled edge 98.

Liquid flowing from pipe 40, under only pressure caused by the vertical distance between the end of the pipe 40 and container 60, falls between rim 97 and shaft 28 on the partially closed end 92 of the cutter. Centrifugal forces caused by rotation of cutter 90 fling the liquid radially across the end 92 towards the outer periphery thereof where rim 97 acts as a barrier preventing the liquid from leaving the cutter. Rim 97 causes the liquid to flow through openings 96 to the hollow interior of the cutter. Centrifugal forces cause the liquid to migrate down the smooth unobstructed inside surface of cutter 90, across its cutting edge 95, and outwardly therefrom as indicated by arrows 99. The liquid cools cutting edge 95, lubricates the movement of edge 95 against the surface of main 11, and flushes out particles of the main 11 separated during the cutting operation. Thus, liquid need not be forced under artificial pressure across the cutting surface 95 of the cutter 90 because the cooperating action of the cutter structure and centrifugal forces derived from rotation of the cutter add sufficient pressure to the liquid flowing across the cutting surface 95 to accomplish the required functions.

By employing apparatus in accord with the invention, the use of circular cutters for tapping holes in hard surfaced ceramic sewer mains is made practical. The use of non-muscle-driven cutter actuating mechanism 13 insures relatively accurate control of cutter rotational speeds and smooth application of power, thus enabling a diamond-surfaced cutter to tap a main in a relatively short time. By providing control circuit 81 and interacting valves 56 and 57 for ensuring a supply of liquid when cutter 90 is in operation, the life of such cutters is greatly extended. Use of the hydraulic motor 50 for powering cutter 90 enables the assembly to be portable and to derive its power from self-subsisting prime mover 69.

The combination of prime mover 69 with containers 60 and 61 as a unitized wheeled vehicle assures portability of the apparatus into locations inaccessible by automobiles or other vehicles. The use of a gasoline engine or other self-subsisting prime mover 69 eliminates the necessity for connection to external sources of power, such as A.C. power lines or power shafts on an automobile. This means that sewer pipes in highly remote locations can be tapped by the apparatus. Furthermore, the need for a power driven pump for supplying liquid under pressure to the cutting surface 95 is eliminated by the special structure of the cutter itself; the result is that operation of an entire sewer tapping assembly is not dependent on operation of a pump for supplying cutter cooling liquid.

It will be understood, of course, that while the forms of the invention herein shown and described constitute preferred embodiments, it is not intended herein to illustrate all of the equivalent forms or ramifications thereof. It will also be understood that the words used are words of description rather than of limitation, and that various changes may be made without departing from the spirit or scope of the invention herein disclosed. It is aimed in the appended claims to cover all such changes as fall within the true spirit and scope of the invention.

What is claimed is:

1. A portable power-driven assembly for cutting a hole in an earth-buried sewer pipe comprising:
   (A) a rigid frame having a supporting plate and two pairs of legs generally perpendicular to said plate integral therewith,
   (B) means for removably attaching said frame to such pipe comprising:
      (1) a chain connected to each pair of legs for encircling such pipe,
      (2) one end of each chain having fastener means for detachable connection to its associated leg, and
      (3) screw-actuated means on each chain for loosening and tightening same around such pipe,
   (C) rigid plate means generally parallel to said supporting plate movable with respect to said frame and such sewer pipe,
   (D) a pair of hydraulic pistons each having its shaft immovably secured to one side of said supporting plate,
   (E) a pair of hydraulic cylinders, each receiving a piston and having an end secured to one side of said plate means for causing movement thereof,
   (F) hydraulic motor means mounted on the opposite side of said plate means,
      (1) supply conduit means for connecting said motor means to a source of hydraulic fluid under pressure,
      (2) return conduit means for said hydraulic fluid, (G) means for supplying hydraulic fluid under pressure selectively to opposite ends of said cylinders for causing movement of said plate means toward and away from such sewer pipe comprising,
   (1) flow directing valve means having an inlet connected to said supply conduit means and an outlet connected to said return conduit means,
   (2) plate means having an aperture smaller in diameter than said supply conduit means controlling rate of flow of hydraulic fluid between said supply conduit means and valve means, and
   (3) pressure relief means cooperating with said apertured plate means for maintaining the pressure in said cylinders below that in said supply conduit means,
(H) shaft means rotated by said motor means extending through said supporting plate,
(I) a cutter having a diamond-edged cutting surface requiring a supply of liquid during cutting, there being an aperture in an end of said cutter remote from its cutting surface,
(J) rigid liquid pipe means having an end adjacent said apertured end of said cutter for supplying such liquid,
   (1) said liquid pipe means being secured to said plate means so as to be movable therewith,
   (2) there being a hole in said supporting plate slidingly receiving said liquid pipe means,
whereby movement of said cylinders causes simultaneous movement of said cutter and said end of said liquid pipe means between the opposite side of said supporting plate and such sewer pipe toward and away from such sewer pipe.

2. A portable power-driven assembly for cutting a hole in an earth-buried sewer pipe comprising:
(A) a rigid frame having a support surface and legs generally perpendicular to said surface integral therewith, releasable fastener means connecting said legs for immovably attaching said frame to an exposed portion of such sewer pipe,
(B) rigid plate means generally parallel to said support surface movable with respect to said frame and such sewer pipe,
(C) mating hydraulic cylinder and piston means,
   (1) said piston means being immovably secured to said support surface, and
   (2) said cylinder means having an end secured to said plate means for causing movement thereof,
(D) hydraulic motor means mounted on said plate means,
   (1) supply conduit means for connecting said motor means to a source of hydraulic fluid under pressure,
   (2) return conduit means for connecting said motor means to a reservoir for hydraulic fluid,
(E) means for supplying hydraulic fluid under pressure selectively to opposite ends of said cylinder means for causing movement of said plate means toward and away from such sewer pipe comprising,
   (1) flow directing valve means having an inlet connected to said supply conduit upstream from said motor means and an outlet connected to said return conduit downstream from said motor means,
   (2) means controlling rate of flow of hydraulic fluid between said supply conduit and valve means,
   (3) pressure relief means between said valve means and said cylinder means,
(F) shaft means driven by said motor means extending through said support surface,
(G) rotary cutter means having cutting surface requiring a supply of liquid during cutting,
(H) rigid liquid pipe means having an end adjacent said cutter means for supplying such liquid,
   (1) said liquid pipe means being secured to said plate means so as to be movable therewith,
   (2) there being a hole in said support surface slidingly receiving said liquid pipe means,
whereby movement of said cylinder means causes simultaneous movement of said cutter means and said end of said liquid pipe means between said support surface and such sewer pipe toward and away from such sewer pipe.

3. A portable power-driven assembly for cutting a hole in an earth-buried sewer pipe comprising:
(A) a rigid frame having a support portion and legs generally perpendicular to said portion integral therewith, releasable fastener means connecting said legs for immovably attaching said frame to an exposed portion of such sewer pipe,
(B) rigid plate means generally parallel to said portion movable with respect to said frame and such sewer pipe,
(C) a pair of hydraulic pistons each having its shaft immovably secured to one side of said portion,
(D) a pair of hydraulic cylinders, each receiving a piston and having an end secured to one side of said plate means for causing movement thereof,
(E) means for supplying hydraulic fluid under pressure selectively to opposite ends of said cylinders for causing movement of said plate means toward and away from such sewer pipe,
(F) hydraulic motor means mounted on the opposite side of said plate means, said motor means being adapted to be connected to a source of hydraulic fluid under pressure,
(G) shaft means rotated by said motor means extending through said portion,
(H) cutter means having a diamond-edged cutting surface requiring a supply of liquid during cutting,
(I) rigid liquid pipe means having an end adjacent said cutter means for supplying such liquid,
   (1) said liquid pipe means being secured to said plate means so as to be movable therewith,
   (2) there being a hole in said portion slidingly receiving said liquid pipe means,
whereby movement of said cylinders causes simultaneous movement of said cutter means and said end of said liquid pipe means between the opposite side of said portion and such sewer pipe toward and away from such sewer pipe.

4. A portable power-driven assembly for cutting a hole in an earth-buried sewer pipe comprising:
(A) a rigid frame having a support surface and leg means generally perpendicular to said surface, releasable fastener means connecting said leg means for immovably connecting said frame to an exposed portion of such sewer pipe,
(B) rigid plate means generally parallel to said support surface movable with respect to said frame and such pipe,
(C) mating hydraulic cylinder and piston means, one of said mating hydraulic means being immovably connected to said support surface, and the other said mating hydraulic means being connected to said plate means for causing movement thereof,
(D) means for supplying hydraulic fluid under pressure selectively to opposite ends of said cylinder means for causing movement of said plate means toward and away from such pipe,
(E) hydraulic motor means supported by said plate means, said motor means being adapted to be connected to a source of hydraulic fluid under pressure,
(F) shaft means driven by said motor means extending through said support surface,
(G) rotary cutter means having cutting surface requiring a supply of liquid during cutting,
(H) liquid pipe means having an end adjacent said cutter means for supplying such liquid, (1) said liquid pipe means being connected to said plate means so as to be movable therewith,
(2) there being a hole in said support surface receiving said liquid pipe means,
whereby relative movement of said cylinder and piston means causes simultaneous movement of said cutter means and said end of said liquid pipe means between said support surface and such sewer pipe toward and away from such sewer pipe.

5. Portable power-driven apparatus for cutting circular holes in a body comprising:
(A) support means adapted to be immovably attached to such body, and fastener means for removably attaching said support means to such body,
(B) rigid plate means movable with respect to said support means,
(C) mating hydraulic cylinder and piston means,
(1) said piston means being immovably secured to said support means, and
(2) said cylinder means having an end secured to said plate means for causing movement thereof,
(D) means including rigid tubular pipes for supplying hydraulic fluid under pressure selectively to opposite ends of said cylinder means for causing movement of said plate means toward and away from such body,
(E) hydraulic motor means mounted on said plate means, hydraulic coupling means for connecting said motor means to a source of hydraulic fluid under pressure,
(F) shaft means driven by said motor means,
(G) rotary cutter means having a cutting surface requiring a supply of liquid during cutting,
(H) rigid pipe means having an end adjacent said cutter means for supplying such liquid,
(1) said pipe means being secured to said plate means so as to be movable therewith,
(2) there being a hole in said support means slidingly receiving said pipe means,
whereby said piston and cylinder means cause simultaneous movement of said cutter means and pipe means toward and away from such body.

6. Portable power-driven apparatus for cutting circular holes in a body comprising:
(A) support means adapted to be immovably connected to such body, and fastener means for removably connecting said support means to such body,
(B) rigid plate means movable with respect to said support means,
(C) mating hydraulic cylinder and piston means,
(D) one of said mating hydraulic means being immovably connected to said support means and the other of said mating hydraulic means being connected to said plate means for causing movement thereof,
(E) means for supplying hydraulic fluid under pressure selectively to opposite ends of said cylinder means for causing movement of said plate means toward and away from such body,
(F) hydraulic motor means supported by said plate means, hydraulic coupling means for connecting said motor means to a source of hydraulic fluid under pressure,
(G) shaft means driven by said motor means,
(H) rotary cutter means having a diamond-edged cutting surface requiring a supply of liquid during cutting,
(I) pipe means having an end adjacent said cutter means for supplying such liquid,
(1) said pipe means being connected to said plate means so as to be movable therewith,
(2) there being a hole in said support means receiving said pipe means,
whereby said piston and cylinder means cause simultaneous movement of said cutter means and pipe means toward and away from such body.

7. Portable power-driven apparatus for cutting circular holes in a body comprising:
(A) support means and means for immovably attaching said support means to such body,
(B) plate means movable with respect to said support means,
(C) two hydraulic pistons, each having its shaft immovably secured to said support means,
(D) two hydraulic cylinders, each receiving a piston and having an end secured to said plate means for causing movement thereof,
(E) hydraulic motor means mounted on said plate means, and hydraulic coupling means for connecting said motor means to a high pressure source of hydraulic fluid,
(F) means for supplying high pressure hydraulic fluid selectively to opposite ends of said cylinders for causing movement of said plate means toward and away from such body comprising,
(1) flow directing valve means having an inlet connected upstream from said motor means and an outlet connected downstream from said motor means,
(2) apertured plate means controlling rate of flow of hydraulic fluid to said valve means, and
(3) pressure relief means cooperating with said apertured plate means for maintaining the pressure in said cylinders below that of said high pressure source,
(G) shaft means driven by said motor means, and cutter means attached to said shaft means,
whereby movement of said cylinder means causes movement of said cutter means toward and away from such body.

8. Portable power-driven apparatus for cutting circular holes in a body comprising:
(A) support means and means for immovably attaching said support means to such body,
(B) plate means movable with respect to said support means,
(C) hydraulic piston means having a shaft immovably secured to said support means,
(D) hydraulic cylinder means receiving said piston means and having an end secured to said plate means for causing movement thereof,
(E) hydraulic motor means mounted on said plate means,
(1) supply conduit means for connecting said motor means to a source of hydraulic fluid under pressure,
(2) return conduit means for said hydraulic fluid,
(F) means for supplying hydraulic fluid under pressure selectively to opposite ends of said cylinder means for causing movement of said plate means toward and away from such body comprising,
(1) flow directing valve means having an inlet connected to said supply conduit and an outlet connected to said return conduit,
(2) plate means having an aperture smaller in diameter than said supply conduit means controlling rate of flow of hydraulic fluid between said supply conduit means and valve means,
(3) pressure relief means cooperating with said plate means for maintaining the pressure in said cylinders below that in said supply conduit means, and
(4) a plurality of rigid tubular pipes interconnecting said valve means, pressure relief means, and cylinder means,
(G) shaft means driven by said motor means, and cutter means attached to said shaft means,
whereby movement of said cylinder means causes movement of said cutter means toward and away from such body.

9. Portable power-driven apparatus for cutting circular holes in a body comprising:
   (A) rigid support frame means adapted to be immovably connected to such body, and fastener means for removably connecting said frame means to such body,
   (B) rigid plate means movable with respect to said frame means,
   (C) mating hydraulic cylinder and piston means,
   (D) one of said mating hydraulic means being immovably connected to said frame means and the other of said mating hydraulic means being connected to said plate means for causing movement thereof,
   (E) hydraulic motor means supported by said plate means,
      (1) supply conduit means for connecting said motor means to a source of hydraulic fluid under pressure,
      (2) return conduit means for connecting said motor means to a reservoir for hydraulic fluid,
   (F) means for supplying hydraulic fluid under pressure selectively to opposite ends of said cylinder means for causing movement of said plate means toward and away from such body comprising,
      (1) flow directing valve means having an inlet connected to said supply conduit upstream from said motor means and an outlet connected to said return conduit downstream from said motor means,
      (2) means controlling rate of flow of hydraulic fluid between said supply conduit and valve means,
      (3) pressure regulating means between said flow rate controlling means and said cylinder,
   (G) shaft means driven by said motor means, and cutter means attached to said shaft means,
whereby said piston and cylinder means cause movement of cutter means toward and away from such body.

10. Portable power-driven apparatus for cutting circular holes in a body comprising:
   (A) support means and means for immovably attaching said support means to such body,
   (B) plate means movable with respect to said support means,
   (C) mating hydraulic cylinder and piston means,
   (D) one of said mating hydraulic means being immovably connected to said support means and the other of said mating hydraulic means being connected to said plate means for causing movement thereof,
   (E) hydraulic motor means supported by said plate means,
      (1) supply conduit means for connecting said motor means to a source of hydraulic fluid under pressure,
      (2) return conduit means for said hydraulic fluid,
   (F) means for supplying hydraulic fluid under pressure selectively to opposite ends of said cylinder means for causing movement of said plate means toward and away from such body comprising,
      (1) flow directing valve means having an inlet connected to said supply conduit and an outlet connected to said return conduit,
      (2) apertured plate means controlling rate of flow of hydraulic fluid between said supply conduit and valve means, and
      (3) pressure regulating means cooperating with said apertured plate means for maintaining the pressure in said cylinder below that in said supply conduit means,
   (G) shaft means driven by said motor means, and cutter means attached to said shaft means,
whereby said piston and cylinder means cause movement of said cutter means toward and away from such body.

11. A portable power-driven assembly for cutting a hole in an earth-buried sewer pipe comprising:
   (A) a rigid frame having a supporting plate and two pairs of legs generally perpendicular to said plate integral therewith,
   (B) means for removably attaching said frame to such pipe comprising:
      (1) a chain connected to each pair of legs for encircling such pipe,
      (2) one end of each chain having fastener means for detachable connection to its associated leg, and
      (3) screw-actuated means on each chain for loosening and tightening same around such pipe,
   (C) rigid plate means generally parallel to said supporting plate movable with respect to said frame and such pipe,
   (D) mating hydraulic cylinder and piston means,
      (1) said piston means being immovably secured to said supporting plate, and
      (2) said cylinder means having an end secured to said plate means for causing movement thereof,
   (E) means for supplying hydraulic fluid under pressure selectively to opposite ends of said cylinder means for causing movement of said plate means toward and away from such pipe,
   (F) hydraulic motor means mounted on said plate means, said motor means being adapted to be connected to a source of hydraulic fluid under pressure,
   (G) shaft means driven by said motor means extending through said supporting plate,
   (H) rotary cutter means having cutting surface requiring a supply of liquid during cutting,
   (I) rigid liquid pipe means having an end adjacent said cutter means for supplying such liquid,
      (1) said liquid pipe means being secured to said plate means so as to be movable therewith,
      (2) there being a hole in said supporting plate slidingly receiving said liquid pipe means,
whereby movement of said cylinder means causes simultaneous movement of said cutter means and said end of said liquid pipe means between said supporting surface and such sewer pipe toward and away from such sewer pipe.

12. A portable power-driven assembly for cutting a hole in an earth-buried sewer pipe comprising:
   (A) a rigid frame having a supporting plate and two pairs of legs generally perpendicular to said plate integral therewith,
   (B) means for removably attaching said frame to such pipe comprising,
      (1) a chain connected to each pair of legs for encircling such pipe,
      (2) one end of each chain having fastener means for detachable connection to its associated leg, and
      (3) screw-actuated means on each
         chain for
         loosening and tightening same around such pipe,
   (C) rigid plate means movable with respect to said supporting plate and such pipe,
   (D) mating hydraulic cylinder and piston means,
   (E) one of said mating hydraulic means being immovably secured to said supporting plate on the side opposite said legs, and the other of said mating hydraulic means being secured to said plate means for causing movement thereof,
   (F) means for supplying hydraulic fluid under pressure selectively to opposite ends of said cylinder means for causing movement of said plate means toward and away from such pipe,
   (G) hydraulic motor means mounted on said plate means on the side opposite said other mating hydraulic means, said motor means being adapted to be connected to a source of hydraulic fluid under pressure, (H) shaft means extending through said support plate driven by said motor means, and pipe cutter means attached to said shaft means, whereby said piston and cylinder means cause movement of cutter means toward and away from such pipe.

13. A portable power-driven assembly for cutting a hole in an earth-buried sewer pipe comprising:
   (A) a rigid frame having a support surface and leg means generally perpendicular to said surface, releasable fastener means connecting said leg means for immovably connecting said frame to an exposed portion of such sewer pipe,
   (B) rigid plate means generally parallel to said support surface movable with respect to said frame and such pipe,
   (C) mating hydraulic cylinder and piston means,
   (D) one of said mating hydraulic means being immovably connected to said support surface and the other of said mating hydraulic means being connected to said plate means for causing movement thereof,
   (E) means for supplying hydraulic fluid under pressure selectively to opposite ends of said cylinder means for causing movement of said plate means toward and away from such pipe,
   (F) hydraulic motor means supported by said plate means, said motor means being adapted to be connected to a source of hydraulic fluid under pressure,
   (G) shaft means driven by said motor means extending through said support surface, and
   (H) cutter means attached to said shaft means between said support surface and such pipe, whereby relative movement of said piston and cylinder means cause movement of cutter means between said support surface and such pipe toward and away from such pipe.

14. A portable power-driven assembly for cutting a hole in an earth-buried sewer pipe comprising:
   (A) rigid support frame means and fastener means for immovably attaching said frame means to an exposed portion of such sewer pipe,
   (B) rigid plate means movable with respect to said frame means and such pipe,
   (C) mating hydraulic cylinder and piston means,
     (1) said piston means being immovably secured to said frame means, and
     (2) said cylinder means having an end secured to said plate means for causing movement thereof,
   (D) means including rigid tubular pipes for supplying hydraulic fluid under pressure selectively to opposite ends of said cylinder means for causing movement of said plate means toward and away from such pipe,
   (E) hydraulic motor means mounted on said plate means, said motor means being connectable to a source of hydraulic fluid under pressure,
   (F) shaft means driven by said motor means, and pipe cutter means attached to said shaft means, whereby movement of said cylinder means causes movement of said cutter means toward and away from such pipe.

15. Portable power-driven apparatus for cutting circular holes in a body comprising:
   (A) rigid support frame means adapted to be immovably connected to such body, and fastener means for removably connecting said frame means to such body,
   (B) rigid plate means movable with respect to said frame means,
   (C) mating hydraulic cylinder and piston means,
   (D) one of said mating hydraulic means being immovably connected to said frame means and the other of said mating hydraulic means being connected to said plate means for causing movement thereof,
   (E) means for supplying hydraulic fluid under pressure selectively to opposite ends of said cylinder means for causing movement of said plate means toward and away from such body.
   (F) hydraulic motor means supported by said plate means, hydraulic coupling means for connecting said motor means to a source of hydraulic fluid under pressure,
   (G) shaft means driven by said motor means, and cutter means attached to said shaft means, whereby said piston and cylinder means cause movement of cutter means toward and away from such body.

16. In portable apparatus for cutting circular holes in pipe comprising:
   (A) cutter means requiring a cooling liquid on its cutting surface during operation, and means containing a supply of cooling liquid,
   (B) hydraulic motor means driving shaft means connected to said cutter for rotating same,
   (C) means for supplying high pressure hydraulic liquid for powering said hydraulic motor including a high pressure supply pipe and a low pressure return pipe, and
   (D) a pipe for conveying said cooling liquid to said cutting surface;
      the improvement in means for controlling flow of said liquids comprising:
         (a) a pipe connecting said high and low pressure conduits between said motor means and the source of high pressure hydraulic liquid,
         (b) first valve means opening and closing said connecting pipe,
         (c) second valve means opening and closing said liquid conveying pipe,
         (d) lever means connecting said first and second valve means so that said first valve means opens said connecting pipe when said second valve means closes said liquid conveying pipe, and vice versa, whereby flow of cooling liquid is prevented when said motor means is inactivated, yet flow of cooling liquid is ensured when said motor drives said cutter means.

17. In a system for cutting circular holes in pipe comprising:
   (A) a diamond-edged cutter requiring cooling liquid on its cutting surface during operation, and means containing a supply of cooling liquid,
   (B) a hydraulic motor connected to said cutter for rotating same,
   (C) a source of pressurized hydraulic liquid for powering said hydraulic motor including a high pressure supply conduit and a low pressure return conduit, and
   (D) conduit means for conveying said cooling liquid to said cutting surface;
      the improvement in means for controlling flow of said liquids comprising:
         (a) short circuit conduit means connecting said high and low pressure conduits between said motor means and source of pressurized hydraulic liquid,
         (b) first valve means for opening and closing said short circuit conduit means,
         (c) second valve means for opening and closing said cooling liquid conduit means,
         (d) said first and second valve means being interconnected so that said first valve means opens said short circuit conduit when said second valve means closes said cooling liquid conduit means, and vice versa, whereby flow of cooling liquid is prevented when said hydraulic motor is inactivated, yet flow of cooling liquid is ensured when said hydraulic motor drives said cutter, 18. In portable power-driven apparatus for cutting circular holes in a sewer main comprising:
   (A) support means adapted to be immovably connected to such sewer main,

15

(B) plate means movable with respect to said support means,
(C) hydraulic motor means supported by said plate means, hydraulic coupling means for connecting said motor means to a source of hydraulic liquid under pressure,
(D) shaft means driven by said motor means,
(E) rotary cutter means having a diamond-edged cutting surface requiring a supply of cooling liquid during cutting, and means containing a supply of cooling liquid,
(F) pipe means having an end adjacent said cutter means for supplying said cooling liquid,
   (1) said pipe means being connected to said plate means so as to be movable therewith,
   (2) there being a hole in said support means receiving said pipe means; and the improvement in means for controlling flow of said liquids comprising:
      (a) first valve means opening and closing said hydraulic coupling means,
      (b) second valve means opening and closing said cooling liquid pipe,
      (c) said first and second valve means being interconnected so that said first valve means opens said hydraulic coupling means to supply pressurized liquid to said motor when said second valve means opens said cooling liquid pipe, and vice versa, whereby flow of cooling liquid is prevented when said motor means is inactivated, yet flow of cooling liquid is ensured when said motor means drives said cutter means.

19. In portable power-driven apparatus for cutting circular holes in a sewer main comprising:

(A) support means adapted to be immovably connected to such sewer main,
(B) rigid plate means movable with respect to said support means,
(C) mating cylinder and piston means for moving said plate means toward and away from such sewer main,
(D) a hydraulic motor supported by said plate means,
(E) a source of pressurized hydraulic liquid for powering said hydraulic motor including a high pressure supply conduit and a low pressure return conduit,
(F) shaft means driven by said motor,
(G) a rotary cutter having a cutting surface requiring a supply of cooling liquid during cutting, and means containing a supply of cooling liquid,
(H) pipe means having an end adjacent said cutter for supplying said cooling liquid,
   (1) said pipe means being connected to said plate means so as to be movable therewith, and
   (2) there being a hole in said support means receiving said pipe means; the improvement in means for controlling flow of said liquids comprising:
      (a) short circuit conduit means connecting said high and low pressure conduits between said motor means and source of pressurized hydraulic liquid,
      (b) first valve means for opening and closing said short circuit conduit means,
      (c) second valve means for opening and clos- said cooling liquid pipe,
      (d) said first and second valve means being interconnected so that said first valve means opens said short circuit conduit when said second valve means closes said cooling liquid pipe, and vice versa, whereby flow of cooling liquid is prevented when said hydraulic motor is inactivated, yet flow of cooling liquid is ensured when said hydraulic motor drives said cutter.

References Cited in the file of this patent
UNITED STATES PATENTS

| | | |
|---|---|---|
| 845,830 | Van Winkle | Mar. 5, 1907 |
| 934,728 | Jacobs | Sept. 21, 1909 |
| 1,406,185 | Hansen | Feb. 14, 1922 |
| 1,580,655 | Dawson | Apr. 13, 1926 |
| 2,024,390 | Roesch | Dec. 17, 1935 |
| 2,228,635 | Magennis | Jan. 14, 1941 |
| 2,478,846 | Smith | Aug. 9, 1949 |
| 2,674,908 | Willingham | Apr. 13, 1954 |
| 2,675,514 | Smith | Apr. 13, 1954 |
| 2,708,852 | Wohlfahrt | May 24, 1955 |
| 2,804,516 | Staak | Aug. 27, 1957 |
| 2,807,441 | Sewell | Sept. 24, 1957 |
| 2,817,983 | Mossberg | Dec. 31, 1957 |
| 2,852,967 | Mueller et al. | Sept. 23, 1958 |
| 2,926,555 | Joy | Mar. 1, 1960 |
| 2,932,193 | Van Scoy | Apr. 12, 1960 |
| 2,996,061 | Miller | Aug. 15, 1961 |
| 3,067,302 | Nielsen | Dec. 4, 1962 |